(12) United States Patent
Rusek et al.

(10) Patent No.: US 6,255,009 B1
(45) Date of Patent: Jul. 3, 2001

(54) COMBINED CYCLE POWER GENERATION USING CONTROLLED HYDROGEN PEROXIDE DECOMPOSITION

(75) Inventors: John J. Rusek, North Edwards, CA (US); Larry C. Triola, Fredericksburg, VA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 09/049,896

(22) Filed: Mar. 28, 1998

(51) Int. Cl.$^7$ ........................................ H01M 8/00
(52) U.S. Cl. .................. 429/13; 429/17; 429/19; 429/20; 429/24
(58) Field of Search .................. 429/13, 17, 19, 429/20, 24

(56) References Cited

U.S. PATENT DOCUMENTS

| | | | |
|---|---|---|---|
| 3,898,794 | * 8/1975 | Ariga | 60/39.18 |
| 3,952,089 | 4/1976 | Kabisch et al. | 423/588 |
| 3,969,899 | * 7/1976 | Nakazawa et al. | 60/670 |
| 4,067,787 | 1/1978 | Kastening et al. | 205/466 |
| 4,430,176 | 2/1984 | Davison | 204/84 |
| 4,455,203 | 6/1984 | Stucki | 205/468 |
| 4,897,252 | 1/1990 | Cochran et al. | 423/591 |
| 4,985,228 | 1/1991 | Kirksey | 423/584 |
| 5,055,286 | 10/1991 | Watanabe et al. | 423/584 |
| 5,112,702 | 5/1992 | Berzins et al. | 429/17 |
| 5,180,573 | 1/1993 | Hiramatsu et al. | 423/584 |
| 5,215,665 | 6/1993 | Crofts et al. | 210/638 |
| 5,401,589 | * 3/1995 | Palmer et al. | 429/13 |
| 5,705,040 | 1/1998 | Johnsson et al. | 203/93 |
| 5,711,146 | 1/1998 | Armstrong et al. | 60/218 |

* cited by examiner

*Primary Examiner*—Arun S. Phasge
(74) *Attorney, Agent, or Firm*—Earl H. Baugher, Jr.; Greg Bokar (57) ABSTRACT

A method for performing work comprising the steps of providing an impellant consisting essentially of hydrogen peroxide of a strength at least 85 mass percent of total impellant, decomposing the impellant, wherein the decomposition releases energy, and, directing the released energy to perform work. A power system having an impellant consisting essentially of hydrogen peroxide of a strength at least 85 mass percent of total impellant is disclosed. The work may provide environmental conditioning, such as heat and potable water.

19 Claims, 6 Drawing Sheets

COMBINED CYCLE POWER GENERATION USING CONTROLLED HYDROGEN PEROXIDE DECOMPOSITION

STATEMENT REGARDING FEDERALLY SPONSORED RESEARCH OR DEVELOPMENT

The invention described herein may be manufactured and used by or for the government of the United States of America for governmental purposes without the payment of any royalties thereon or therefor.

CROSS-REFERENCE TO RELATED APPLICATION

Not Applicable.

MICROFICHE APPENDIX

Not Applicable.

BACKGROUND OF THE INVENTION

1. Field of the Invention

The present invention relates to a system and method for providing released energy to perform work. More particularly, the system and method of the present invention use hydrogen peroxide as an energy source in electric power and/or propulsion systems. Most particularly, the hydrogen peroxide provides motive/stationary and electrical power, and environmental conditioning to vehicles, vessels, aircraft and/or spacecraft.

2. Brief Description of the Related Art

Currently, motive power of carriers such as land vehicles, aircraft and/or maritime vessels require power generation which is dependent on conventional systems such as non-renewable fossil fuel or battery discharge. This power generation is inefficient and produces toxic waste products, such as carbon monoxide. Engines use the available atmosphere to combine with the fuel for combustion. Although filters or converters are used on vehicles, and scrubbers are commonly installed on board vessels, safety hazards remain problematic with these fuels. Efficiencies have increased with conventional fuels, however, with the large number of carriers in use today, even minimal amounts of an emitted toxicant becomes cumulatively handful. In addition to environmental contamination, fossil fuels such as gasoline present other problems. Fuels need to be transported to distribution centers. Several types of fossil fuels are used, which add to the logistical complexity. There is also a global limitation of the fossil fuels available which may be refined into a power source.

Within a military operation, several types of carriers are used, including vehicles such as tanks, motorcycles, trains and armored personnel carriers, aircraft such as helicopters, jets, unmanned aerial vehicles, and maritime vessels such as cargo transports, boats, swimmer delivery vehicles and warships. Generally, these carriers require differing types of fossil fuels. Transporting fuel to an operational area imposes severe logistics burdens and operational expense. Having to provide various types of fuel significantly increases this burden. In addition to the increased coordination of routing the fuels to specific locations and units, special ships and aircraft are required to transport the fuels. This decreases the available sealift and airlift capabilities for a military force structure.

At sea, fuel replenishment is logistically difficult. Underway refueling of warships requires that fuel supply ships transfer fuel while hoses are connected between the warship and supply ship. Ships must coordinate rendevous points and schedules, which may interfere with operational demands. During the refueling operation, high seas or inclement weather may increase risk for an already dangerous but necessary operation. On board maritime vessels, power systems consume the available atmosphere, or require bottled oxidizers, and emit noxious exhaust products. For maritime platforms, these toxic by-products present immediate habitability concerns. For maritime platforms such as submarines, submersibles and the like, health and safety concerns become acute. Having additional supplies of breathable air on board decreases the amount of available space useful for other purposes, such as equipment, personnel, or supplies.

Many types of fossil fuel produce a signature or residue, either thermal or chemical, which identifies the location of a carrier, such as a vehicle on land or vessel at sea. This provides an adversary with monitoring and targeting information. Additionally, power generation from many of these fuel sources does not provide a silent powering system, which also discloses the location of the carrier.

Some carriers use battery power or traditional fuel cells for propulsion, and many of the carriers which use fossil fuels for propulsion use battery power for auxiliary systems. Alternative and hybrid systems increase logistical and maintenance problems, as well as weight and integration problems. For example, battery power provided to amphibious delivery vehicles yields low energy shaft work, and hydrogen gas with acid vapors may escape into a confined living space.

Hydrogen peroxide has been successfully used as an oxidizer source for U.S. Navy torpedo propulsion systems, U.S.A.F. attitude control thruster on the X-15, and for reaction control thrusters on the NASA Scout launch vehicles and Mercury spacecraft. However, hydrogen peroxide has not been used as a sole power source for primary and auxiliary systems on carriers.

There is a need in the art to provide a consolidated non-toxic source of power. In addition to providing a uniform power source, an environmentally clean motive power source for various types of carriers and stationary systems is needed.

SUMMARY OF THE INVENTION

The present invention comprises a method for performing work comprising the steps of providing an impellant consisting essentially of hydrogen peroxide, decomposing the impellant, wherein the decomposition releases energy, and, directing the released energy to perform work.

The present invention further comprises a power system comprising an impellant consisting essentially of hydrogen peroxide, means for decomposing the impellant wherein energy is released, and means for producing work from the released energy.

DETAILED DESCRIPTION OF THE PREFERRED EMBODIMENT

The present invention is a system and method for providing potential chemical energy for devices to perform work, such as providing a motive force to carriers, such as on board naval vessels, aircraft, spacecraft, and/or land vehicles, using hydrogen peroxide as the primary reactant. The hydrogen peroxide comprises an impellant. An impellant is a chemical which contains energy releasable by decomposition without combustion. The hydrogen peroxide powers electric and/or propulsion systems on carriers and/or serves as the primary power source and/or auxiliary equipment on other like devices. Sizes of the turbine and/or electric motor drives are proportional to the anticipated use requirement, such as the size of the carrier or moving distance of a lever arm. The present invention provides for environmental conditioning, such as heating elements, electricity generation, and other like systems which provide environmental comfort. The hydrogen peroxide based impellant eliminates toxic emissions, increases reliability and efficiency, reduces sound, and obscures carrier signature relative to conventional fuels. Additionally, the replenishable and environmentally clean impellant may reduce logistic problems in the distribution, transportation and supply of the impellant in such ways as generating hydrogen peroxide on board a vessel en route to a conflict area, or at convenient production facilities, which improves the reaction time of logistical support.

Figure 1:
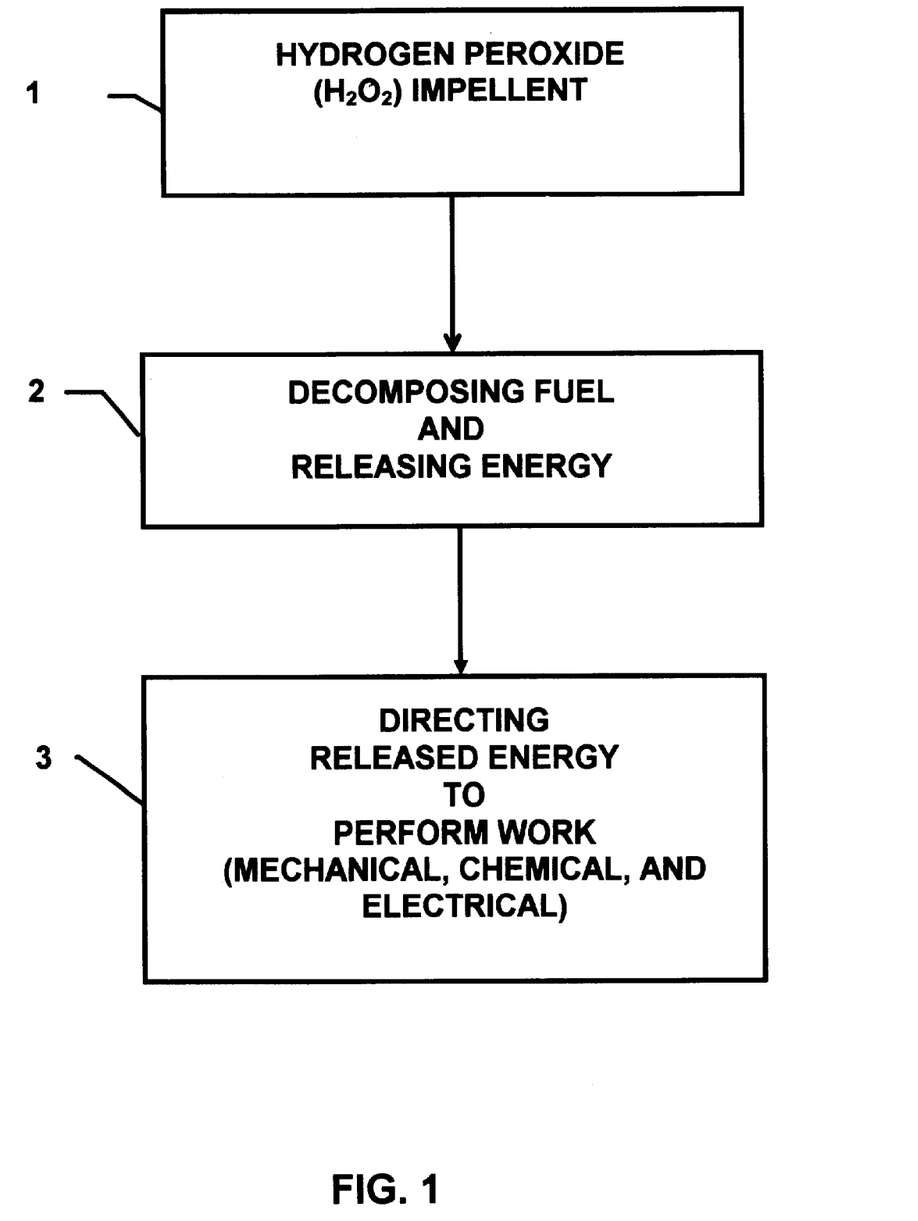
FIG. 1 is a schematic diagram for the system and method for performing work from hydrogen peroxide.

As seen in FIG. 1, the system and method for performing work comprises the steps of providing an impellant consisting essentially of hydrogen peroxide 1, decomposing the impellant, wherein the decomposition releases energy 2, and, directing the released energy to perform work 3. Performed work includes mechanical, electrical and chemical work. As such, the impellant acts as a fuel, propellant, and environmental conditioner. As an environmental conditioner, the impellant provides such products as breathable oxygen at comfortable temperatures, warm and cold potable water, electrical power, heat, and/or the like. As an example, the performed work may be used on any mechanical device which may use pressure-volume work to function. These mechanical devices include, but are not limited to, turbines, Stirling cycle engines, mechanical heat engines, lifts, presses, retractors, extenders, and other applications of internal combustion to engines, diesel engines, and the like. The performed work may replace work performed by these mechanical devices, including internal combustion engines, diesel engines and any other such devices. Preferably, the pressure-volume work drives carriers. Carriers move from one location to another, and use a variety of locomotion means, such as propellers, wheels, tracks, thrusters, and the like. Chemically and electrically, the performed work may include providing a heating element, charging a battery, providing an electrical current, and the like. Amounts of residual products, such as water, water vapor and/or oxygen, may be in the impellant in any amount which does not interfere with the function of the impellant. The hydrogen peroxide may include additional components which include but are not limited to appropriate storage stabilizers or chemical reaction inhibitors, which are known to those skilled in the art. Depending on the amount of residual products and additives, the energy content of hydrogen peroxide based impellant is approximately one-half the energy content of conventional fuels, but efficiencies in extracting the energy is approximately three times greater than conventional systems.

Figure 2:
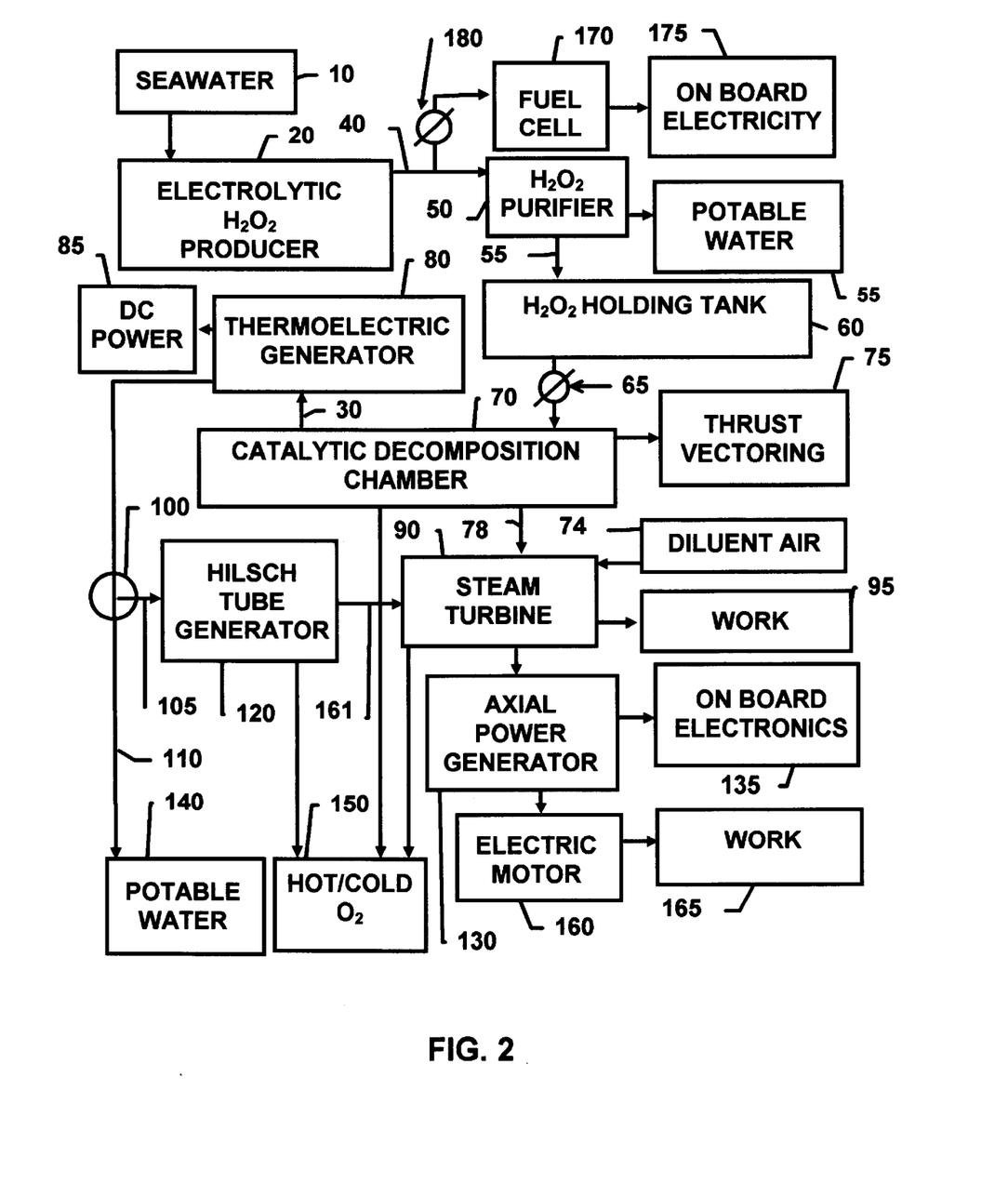
FIG. 2 is a schematic diagram for the power phase of the combined cycle of the present invention showing shipboard use.

FIG. 2 shows a schematic diagram for the power phase of the combined cycle of the present invention showing shipboard use. The method for powering a maritime vessel comprises an impellant consisting essentially of hydrogen peroxide ($H_2O_2$) as a power source. Use of hydrogen peroxide provides a consolidated power source for divergent power systems on board maritime vessels. A single source simplifies the overall ship power-propulsion grid. Additionally, remote cells located at critical power usage areas provide redundancy. For smaller distribution systems, a low pollution turbine/generator combined cycle may be used.

Hydrogen peroxide is produced on board the vessel or is provided from storage tanks. When produced on board the naval vessel, the source of hydrogen peroxide is supplied from electrolytic treatment of seawater using shipboard DC power. Seawater 10 is fed into an electrolytic hydrogen peroxide producer 20 which is powered by DC power 30. In the electrolytic hydrogen peroxide producer 20, the seawater 10 is converted to hydrogen peroxide which exits the electrolytic hydrogen peroxide producer 20 as medium strength hydrogen peroxide 40. Preferably, medium strength hydrogen peroxide comprises from about 35% by mass to about 85% by mass hydrogen peroxide, more preferably from about 50% by mass to about 85% by mass hydrogen peroxide, and most preferably from about 65% by mass to about 85% by mass hydrogen peroxide. Percentage by mass of the hydrogen peroxide refers to the mass percentage of the hydrogen peroxide in relation to a given total mass of impellant. The impellant comprises hydrogen peroxide and water, and trace impurities present from the seawater.

Examples of hydrogen peroxide producers 20 which may be used to produce hydrogen peroxide include such systems as the potassium peroxydisulfate process, the peroxydisulfuric acid process, and/or the direct cathodic or anodic production processes known in the art. For example, a method for the electrolytic process for producing hydrogen peroxide is disclosed in U.S. Pat. No. 4,430,176 (Davison), issued Feb. 7, 1984, the disclosure of which is herein incorporated by reference. U.S. Pat. Nos. 4,067,787 (Kastening et al.), 4,455,203 (Stucki), 5,112,702 (Berzins et al.), 5,180,573 (Hiramatsu et al.), and 5,705,040 (Johnsson et al.), the disclosure of which are herein incorporated by reference, also disclose the production of hydrogen peroxide. These hydrogen peroxide producers 20 may be used for conversion of seawater into hydrogen peroxide.

After exiting the electrolytic hydrogen peroxide producer 20, the medium strength hydrogen peroxide 40 either enters the $H_2O_2$ purifier 50 to be purified to high strength hydrogen peroxide, or travels directly as medium strength hydrogen peroxide to be used within shipboard systems and/or machinery. Purification of the medium strength hydrogen peroxide into high strength hydrogen peroxide in the $H_2O_2$ purifier 50 may be accomplished through separation means such as osmosis, centrifuging, distillation and the like, the best means for a given purpose being determinable by those skilled in the art. The purification of the hydrogen peroxide concentrates the amount of hydrogen peroxide by increasing the mass percentage and reduces impurities. In the $H_2O_2$ purifier 50, the medium strength hydrogen peroxide is purified to about 85% by mass or greater. As a by-product of the purification, potable water 55 is formed. Once purified, the high strength $H_2O_2$ is stored for use. U.S. Pat. Nos. 3,952,089 (Kabisch et al.), 4,985,228 (Kirksey), 5,055,286 (Watanabe et al.), and 5,215,665 (Crofts et al.), the disclosure of which are herein incorporated by reference, disclose the concentration and purification of hydrogen peroxide.

Preferably, high strength hydrogen peroxide comprises from about 85% by mass or greater hydrogen peroxide, more preferably from about 90% by mass hydrogen peroxide or greater, still more preferably from about 95% by mass hydrogen peroxide or greater, and most preferably from about 98% by mass hydrogen peroxide or greater. The higher mass percentage of hydrogen peroxide provides the greatest versatility in energy conversion, with the optimum level of hydrogen peroxide mass percentage for a given use determinable by those skilled in the art. Available energy from the high and medium strength hydrogen peroxide is a defined value which is proportional to the percentage of hydrogen peroxide. For example, at one atmosphere, 100% by mass hydrogen peroxide yields a reaction product with an adiabatic decomposition temperature of 1824° F., 95% by mass hydrogen peroxide yields 1593° F., 90% by mass hydrogen peroxide yields 1364° F., 80% by mass hydrogen peroxide yields 908° F., and from about 64.7% or less by mass hydrogen peroxide yields 212° F.

Purified $H_2O_2$ leaves the $H_2O_2$ purifier 50 to be transferred to and stored in a $H_2O_2$ holding tank 60. The holding tank 60 provides a constant supply of $H_2O_2$ for use on board the maritime vessel. In addition to providing a constant supply of high strength hydrogen peroxide, the hydrogen peroxide contained in the holding tank 60 permits use of the impellant for shipboard stabilization. High strength hydrogen peroxide provides lower storage volume for the same amount released energy of medium strength hydrogen peroxide. Storage of hydrogen peroxide may be economized by increasing the amount of high strength hydrogen peroxide in relation to the amount of medium strength hydrogen peroxide.

From the holding tank 60, the high strength hydrogen peroxide is metered to a catalytic decomposition chamber 70 through a valve 65. Within the catalytic decomposition chamber 70, the high strength hydrogen peroxide decomposes to superheated steam which comprises water vapor and oxygen. The catalytic decomposition chamber 70 includes the technology of such systems as those used in attitude control thrusters from the Mercury and Scout rocket programs, and the like. For shipboard use, the superheated steam is preferably heated to from about 1000° F. to about 1800° F., more preferably from about 1100° F. to about 1500° F., and most preferably from about 1100°0 F. to about 1200° F. The temperature range for the superheated steam varies by use, and may be determined by those skilled in the art.

Decomposition of the hydrogen peroxide within the catalytic decomposition chamber 70 comprises at least one catalyst. Catalyst and systems useful for decomposition of hydrogen peroxide include the disclosed invention in U.S. patent application—Navy Case No. 78897, entitled High-Activity Catalyst for Hydrogen Peroxide Decomposition, filed Mar. 19, 1998, and U.S. Pat. No. 5,711,146 (Armstrong et al.), the disclosures of which are herein incorporated by reference. Catalysts include heterogeneous catalysts, preferably the heterogeneous catalysts are based on alkaline promoted iron, copper, manganese oxides, and the like, dispersed on appropriate substrates.

The superheated steam and oxygen is fed from the catalytic decomposition chamber 70 into either a shipboard steam turbine 90, or used directly for thrust vectoring 75. When used in the steam turbine 90, the energy in the water vapor is used to provide mechanical power, heat water or other fluids which drive a closed cycle heat engine. Generally, the steam turbine 90 may provide amounts of power of from about 5000 horsepower (HP) and below, preferably from about 10 HP to about 3000 HP, more preferably from about 25 HP to about 2500 HP, and most preferably from about 50 HP to bout 1500 HP. The steam may be combined with external diluent air to mechanically rotate the steam turbine 90. The steam may also be used to boil fluid in a closed cycle engine. The steam turbine 90 is mechanically coupled to a propeller 95 to provide shaft work 95, such as propelling the vessel through the water. The steam turbine 90 may also be attached to an axial power generator. The axial power generator provides power for electronics 135 on board the vessel and other auxiliary power, such as a 250 KW power generator which is standard on board naval vessels. The axial power generator 130 may further provide power to an electric motor 160, which provides shaft work 165 for use in steering and/or maneuvering the vessel. It may also be used as the prime driver, especially for an all electric ship. The shipboard steam turbine 90 further provides a source of oxygen 150, which may be recycled into shipboard use. Oxygen is removed from the catalytic decomposition chamber 70, which is used to supply oxygen for shipboard use, such as breathable oxygen on board a submarine. Oxygen may also remain with the water vapor as the water vapor/oxygen mixture passes through the catalytic decomposition chamber 70. The oxygen may be used to power and charge electrical fuel cells 170.

In addition to feeding the steam turbine 90, the superheated steam is fed from the catalytic decomposition chamber 70 into a thermoelectric or thermionic generator 80. The thermoelectric or thermionic generator 80 provides shipboard DC power 85, for use in direct current systems on board the vessel. Superheated steam is fed to the thermoelectric or thermionic generator 80 at an appropriate decomposition temperature, the efficiency of which increases with an increase in temperature.

On leaving the thermoelectric or thermionic generator 80, the water vapor may enter a separator 100. In the separator 100, residual oxygen which remained with the water vapor through the catalytic decomposition chamber 70 is separated from the water vapor. Examples of the separator which may be used to separate oxygen from the water vapor are well known to those skilled in the art, such as flash cooling, mechanical impingement, and/or the like. The oxygen in sent to an environmental conditioner 120, such as the Hilsch tube environmental conditioner, separating oxygen 105 into hot and cold oxygen 150 for environmental uses, such as breathing air, and the like. The separator 100 further separates water vapor 110 to be used as potable water 140 for drinking water, washing water, and similar uses.

Additionally, medium strength hydrogen peroxide 40 may be supplied from the electrolytic hydrogen peroxide producer 20 directly to a fuel cell 170 through a valve 180. The fuel cell 170 is any fuel cell which is capable of providing on board electricity 175. Preferably, the fuel cell 170 comprises an aluminum fuel cell. More preferably, the fuel cell 170 comprises an lithium/aluminum fuel cell. Fuel cells using hydrogen peroxide arc known in the art. Examples of the fuel cells which may be powered by the medium strength hydrogen peroxide include such systems as anodic reaction of aluminum, or other reactive metals, in conjunction with alkaline hydrogen peroxide, and other like systems.

As previously detailed, the present invention includes a power system comprising an impellant consisting essentially of hydrogen peroxide, means for decomposing the impellant wherein energy is released, and means for producing work from the released energy. The power system provides released energy which provides mechanical, electrical, and/ or chemical work in the primary and auxiliary systems of mechanical devices, such as carriers, and/or environmental conditioning, such as heat. As such, the hydrogen peroxide powers carriers or stationary devices without expending environmentally damaging waste from impellant residue. The system may use the reacted hydrogen peroxide to provide breathable air and potable water in conjunction with the carrier. The impellant also is universally applicable to many different types of carriers, including land, waterborne, airborne, and space-borne vehicles. The operational components of the primary and auxiliary systems may be changed by sequence and/or type, the best configuration being determinable by those skilled in the art.

Figure 3:
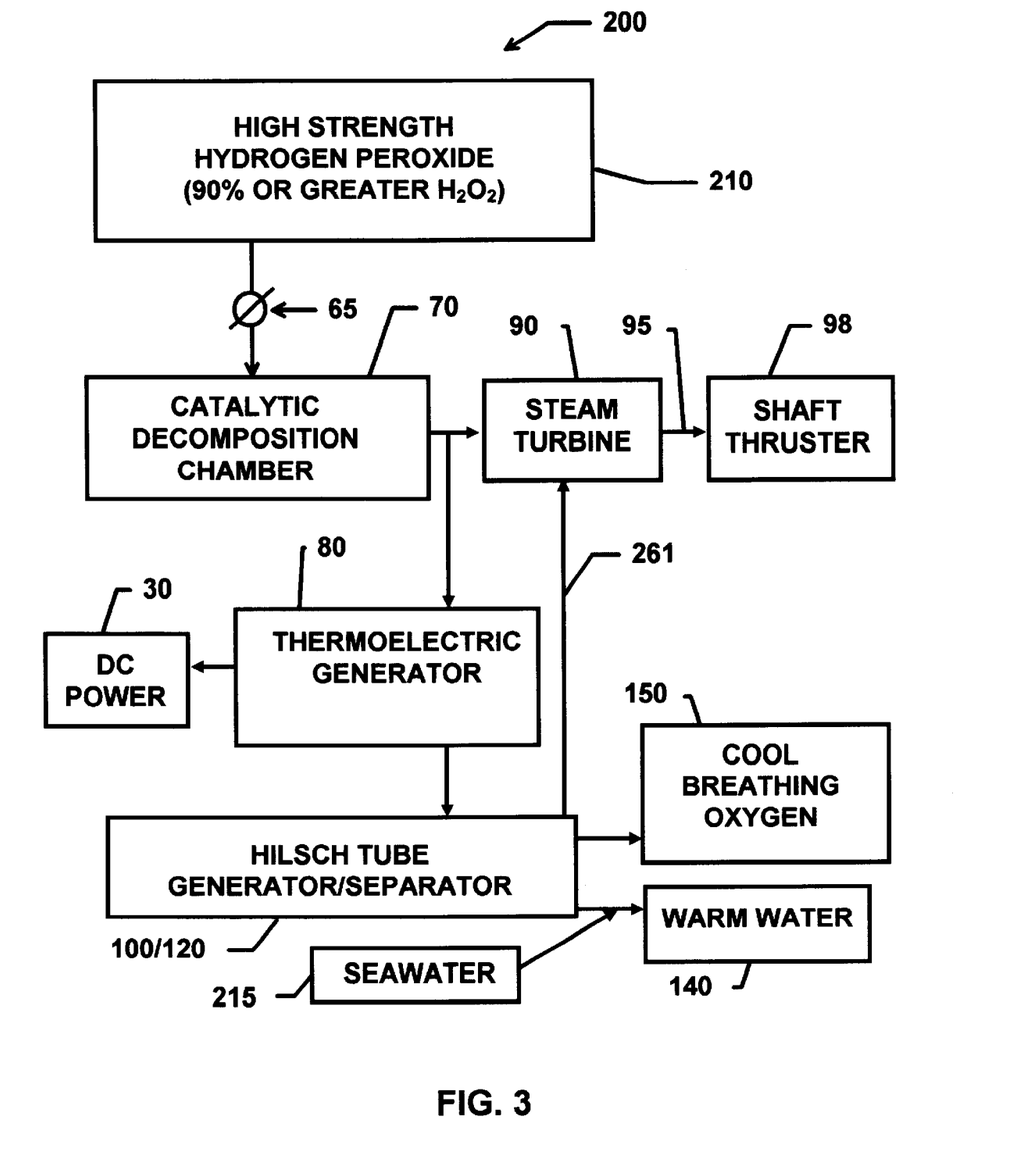
FIG. 3 is a power cycle schematic diagram for a submersible wet diver delivery powered by hydrogen peroxide decomposition.

FIG. 3 is a power cycle schematic diagram for a submersible wet diver delivery vehicle powered by hydrogen peroxide decomposition. As shown in FIG. 3, the power source for the submersible wet diver delivery power cycle 200 comprises a hydrogen peroxide holding tank. High strength hydrogen peroxide 210 travels through a main throttle 65 into the catalytic decomposition chamber 70, also called a solid state catalytic reactor. Water vapor and oxygen, at a temperature of 1200° F., exit the solid state catalytic reactor 70 and are fed into the steam turbine 90 and the thermoelectric or thermionic generator 80. The steam turbine 90 provides shaft work 95 to power a shaft thruster 98. After the 1200° F. superheated steam and oxygen enter the thermoelectric or thermionic generator 80, on board DC power 30 is produced. The water and oxygen exit the thermoelectric or thermionic generator 80 at 100° F., and enter a combined Hilsch Tube Generator/Separator 100 and 120, which separates the water and oxygen and provides breathable oxygen 150 at 50° F., and warm water 140 for wet suits at 150° F., which mixes with seawater 215. The Hilsch Tube Generator/Separator 100 and 120 may also feed into the steam turbine 90 as an intensifier 261.

The major components within the submersible wet diver delivery power cycle 200 contain a minimum number of moving parts, which provide for reliability and easy maintenance. The catalytic decomposition chamber 70 has no moving parts, the steam turbine 90 has one moving part, the thermoelectric or thermionic generator 80 has no moving parts, and the combined Hilsch Tube Generator/Separator 100 and 120 has no moving parts.

Figure 4:
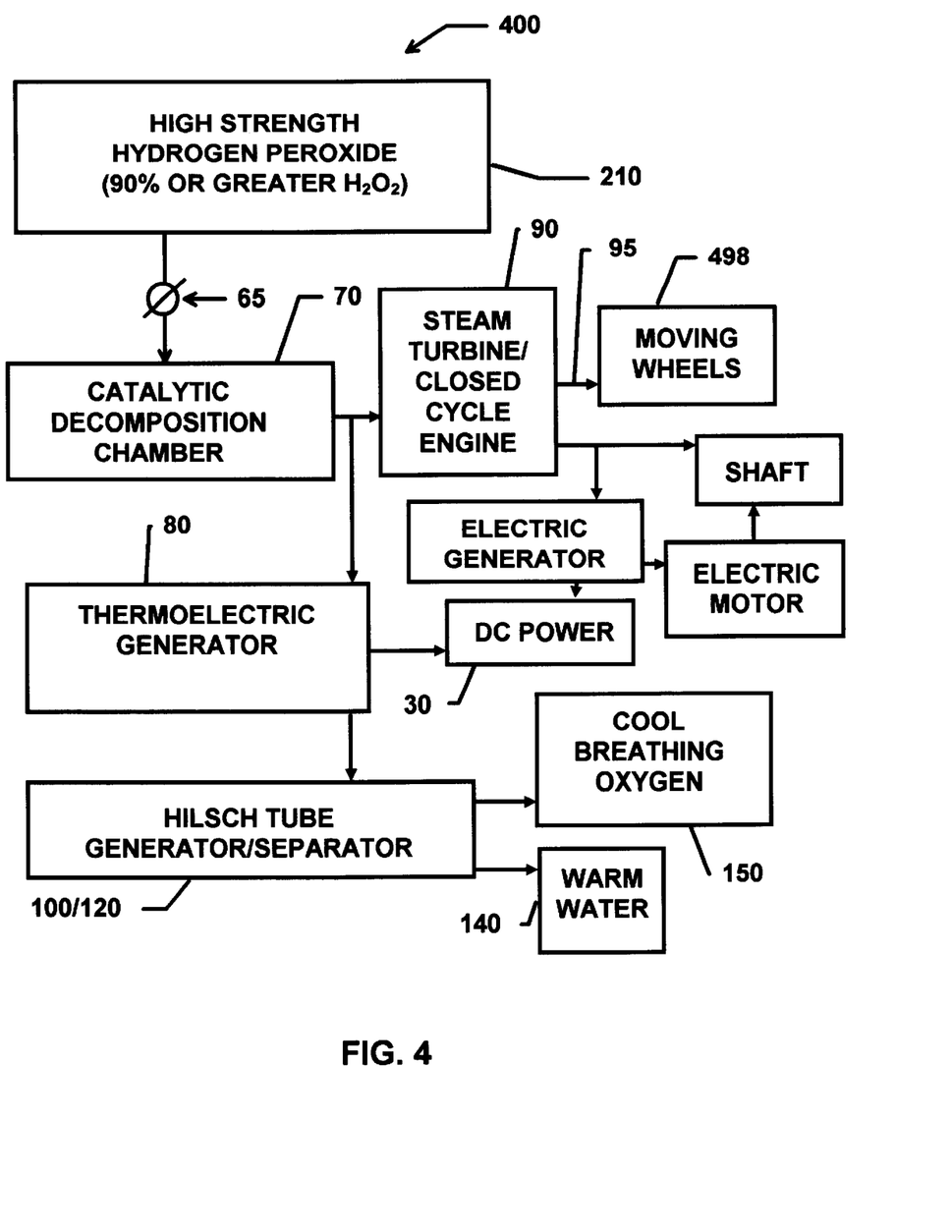
FIG. 4 is a schematic diagram for the power phase of the combined cycle of the present invention for use in a land vehicle.

FIG. 4 is a schematic diagram for the power phase of the combined cycle of the present invention for use in a land vehicle, such as a tank. The released energy provides motive power and environmental support. As shown in FIG. 4, the power source for the land vehicle power cycle 400 comprises a holding tank, which may be supplied from a hydrogen peroxide production facility. High strength hydrogen peroxide 210 travels through a main throttle 65 into the catalytic decomposition chamber 70. Water vapor and oxygen, at a temperature of 1200° F., exit the catalytic decomposition chamber 70 and are fed into the steam turbine 90 and the thermoelectric or thermionic generator 80. The steam turbine 90 provides shaft work 95 to power moving wheels or tracks 498. The shaft work 95 powers moving wheels 498, or may be used in any convenient powering form, such as rotary, oscillating, piston and like motion devices. Additionally, the steam turbine 90 may power a shaft, electric generator, electric motor combination and/or system. After the 1200° F. superheated steam and oxygen enter the thermoelectric or thermionic generator 80, and DC power 30 is produced for electrical systems. The water and oxygen exit the thermoelectric or thermionic generator 80 at 100° F., and enter a combined Hilsch Tube Generator/Separator 100 and 120, which separates the water and oxygen. The combined Hilsch Tube Generator/Separator 100 and 120 provides breathable oxygen 150 at 50° F., which may be needed to counter chemical weapon hazards, and warm water 140 for use within the land vehicle.

Figure 5:
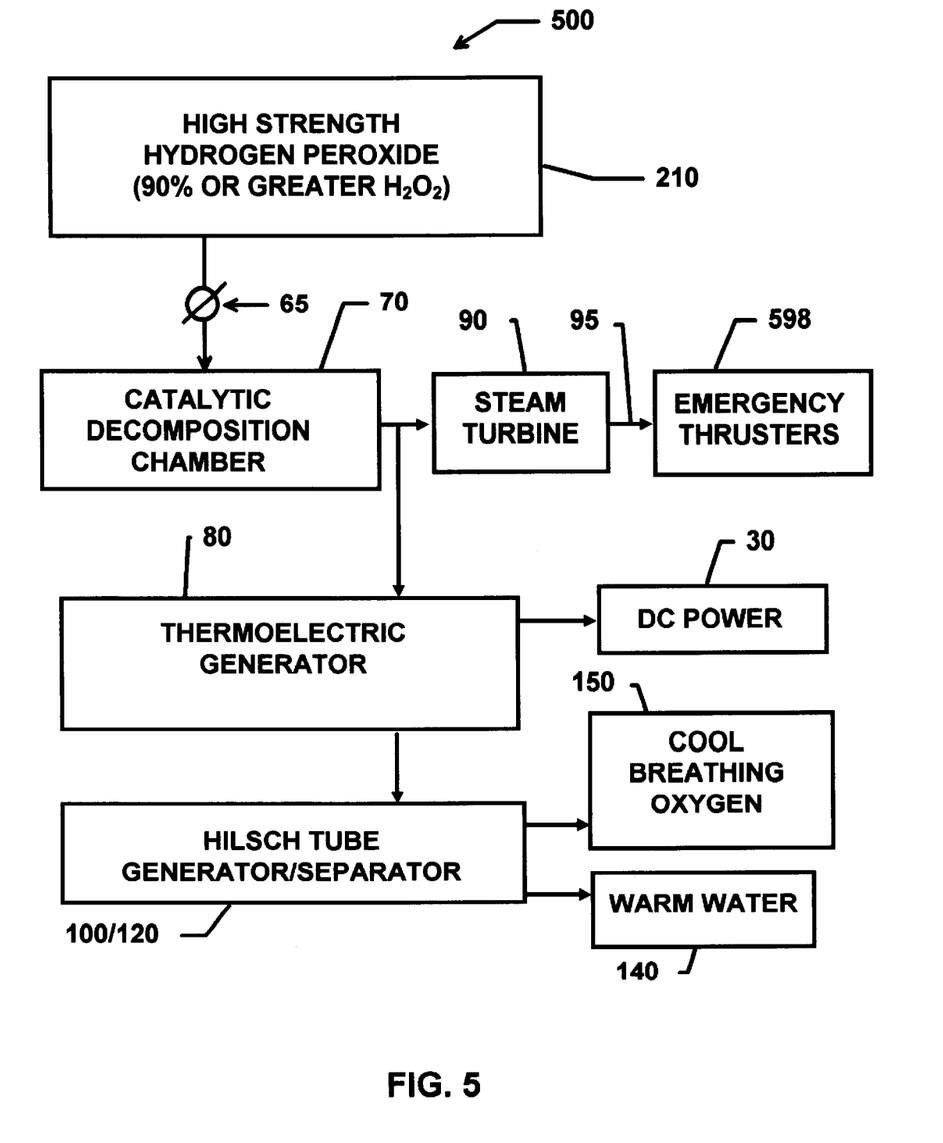
FIG. 5 is a schematic diagram for the power phase of the combined cycle of the present invention for use in a spacecraft; and, FIG. 6 is a schematic diagram for the power phase of the combined cycle of the present invention for use in an aerial vehicle.

FIG. 5 is a schematic diagram for the power phase of the combined cycle of the present invention for use in manned missions in spacecraft. A spacecraft includes carriers which travel through space, facilities located on extraterrestrial bodies, and other such manmade devices used beyond the earth's atmosphere. The released energy provides both motive power and environmental support. As shown in FIG. 5, the power source for the spacecraft power cycle 500 comprises a hydrogen peroxide holding tank. High strength hydrogen peroxide 210 travels through a main throttle 65 into the catalytic decomposition chamber 70. Water vapor and oxygen, at a temperature of 1200° F., exit the catalytic decomposition chamber 70 and are fed into a steam turbine 90 or thruster, and the thermoelectric or thermionic generator 80. The steam turbine 90 provides shaft work 95 to power emergency thrusters 598. After the 1200° F. superheated steam and oxygen enter the thermoelectric or thermionic generator 80, and DC power 30 is produced for electrical systems. The water and oxygen exit the thermoelectric or thermionic generator 80 at 100° F., and enter a combined Hilsch Tube Generator/Separator 100 and 120, which separates the water and oxygen. The combined Hilsch Tube Generator/Separator 100 and 120 provides breathable oxygen 150 at 50° F., and warn water 140 for use within the spacecraft. Water sources for the production of the hydrogen peroxide may be encountered while the spacecraft is in space or on an extraterrestrial body.

Figure 6:
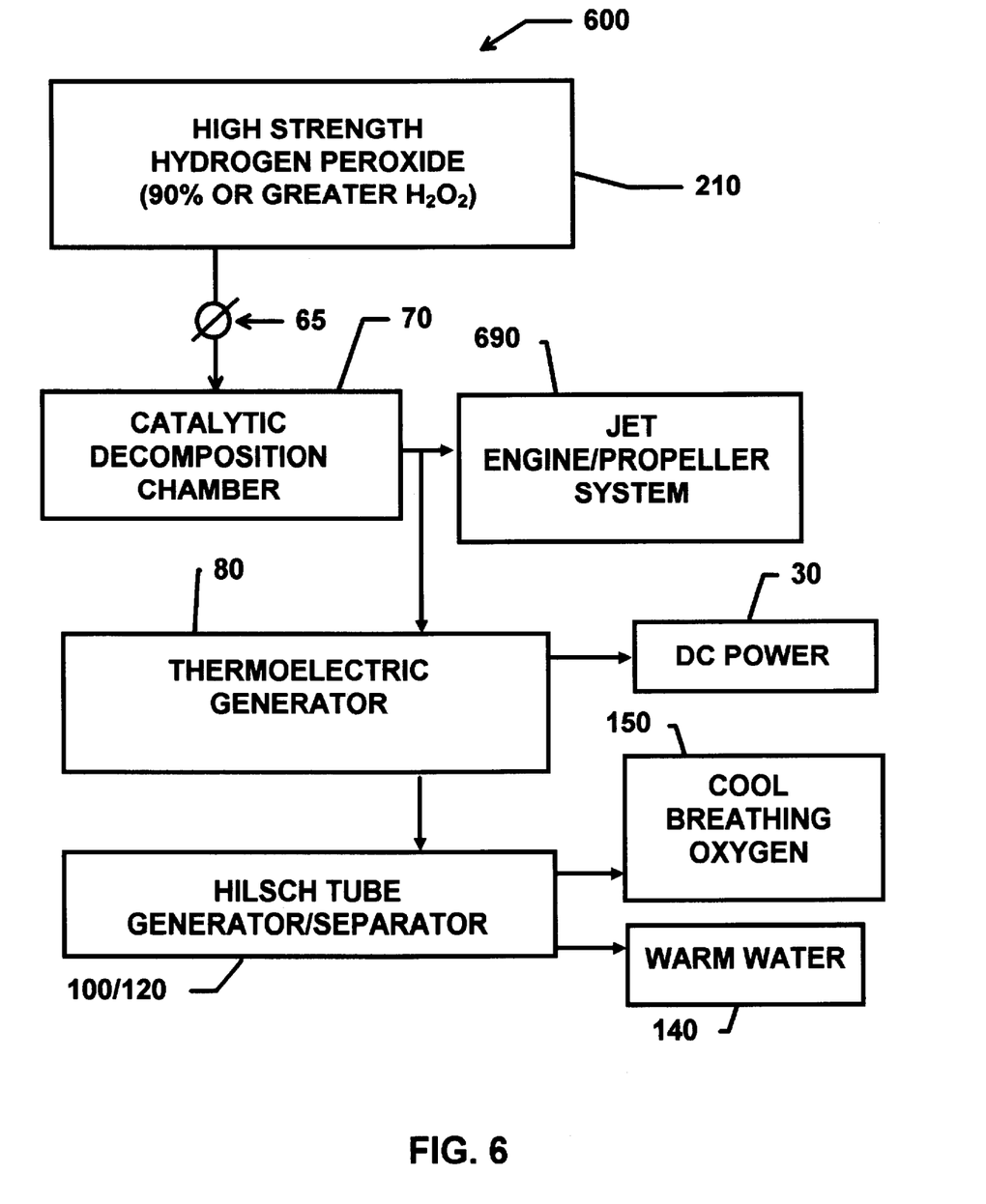

FIG. 6 is a schematic diagram for the power phase of the combined cycle of the present invention for use in an aerial vehicle. Aerial vehicles include carriers such as helicopters, jet craft, unmanned aerial vehicles and other such manmade devices used for flight in the earth's atmosphere. The released energy provides both motive power and environmental support. As shown in FIG. 6, the power source for the aerial vehicle power cycle 600 comprises a hydrogen peroxide holding tank. High strength hydrogen peroxide 210 travels through a main throttle 65 into the catalytic decomposition chamber 70. Water vapor and oxygen, at a temperature of 1200° F., exit the catalytic decomposition chamber 70 and are fed into the jet engine/propeller system 690 and the thermoelectric or thermionic generator 80. The jet engine/propeller system 690 provides motive force. After the 1200° F. superheated steam and oxygen enter the thermoelectric or thermionic generator 80, and DC power 30 is produced for electrical systems. The water and oxygen exit the thermoelectric or thermionic generator 80 at 100° F., and enter a combined Hilsch Tube Generator/Separator 100 and 120, which separates the water and oxygen. The combined Hilsch Tube Generator/Separator 100 and 120 provides breathable oxygen 150 at 50° F., and warn water 140 for use within the aerial vehicle.

The foregoing summary, description and drawings of the invention are not intended to be limiting, but are only exemplary of the inventive features which are defined in the claims.

What is claimed is:

1. A method for performing work comprising:
providing an impellant consisting essentially of hydrogen peroxide of a strength at least 90 mass percent of total said impellant;
decomposing said impellant,
wherein the decomposition products release energy; and
directing the released energy to perform work.

2. The method of claim 1, wherein providing said impellant comprises electrolytic conversion of seawater to form hydrogen peroxide of a strength up to 85 mass percent of total said impellant and further purifying said medium strength hydrogen peroxide so that the mass percentage of hydrogen peroxide in said impellant increases.

3. The method of claim 2 wherein said hydrogen peroxide of a strength up to 85 mass percent of total said impellant is purified to yield an amount of 90% by mass or greater of hydrogen peroxide in said impellant.

4. The method of claim 1, wherein decomposing said impellant further comprises using at least one heterogeneous catalyst.

5. The method of claim 1, wherein the released energy drives a land vehicle.

6. The method of claim 1, wherein the released energy powers a spacecraft.

7. The method of claim 1, wherein the released energy powers an aerial vehicle.

8. The method of claim 1, wherein the released energy drives a maritime vessel.

9. The method of claim 8, wherein the maritime vessel comprises an undersea delivery vehicle.

10. The method of claim 1, wherein providing said impellant consisting of hydrogen peroxide of a strength of at least 85 mass percent of total said impellant comprises storing said hydrogen peroxide of a strength of at least 90 mass percent of total said impellant in a tank prior to decomposing said impellant.

11. The method of claim 1, wherein the released energy drives a heat engine.

12. The method of claim 1, wherein the released energy drives a turbine.

13. The method of claim 1, wherein the released energy provides a temperature gradient which drives a generator selected from the group consisting of thermoelectric generators and thermionic generators.

14. The method of claim 1, wherein decomposing said impellant results in said hydrogen peroxide of a strength of at least 90 mass percent of total said impellant producing environmental conditioning.

15. The method of claim 1, further comprising directing said decomposition products to power a fuel cell.

16. The method of claim 15, wherein oxygen is derived from the decomposition of said impellant, and further comprising powering said fuel cell with said oxygen.

17. The method of claim 1, wherein the performed work replaces work performed by an internal combustion engine.

18. The method of claim 1, wherein the performed work replaces work performed by a diesel engine.

19. A power system comprising an impellant consisting essentially of:
hydrogen peroxide of a strength of at least 90 mass percent of the total impellant;
means for decomposing said impellant wherein energy is released; and
means for producing work from the released energy.

* * * * *